United States Patent [19]

Kawashima et al.

[11] Patent Number: 5,513,285
[45] Date of Patent: Apr. 30, 1996

[54] COMPACT OPTICAL SWITCHING MODULE INCLUDING THIN-FILM HEATERS AND TRIMMED THICK-FILM FIXED RESISTORS

[75] Inventors: Toshiyuki Kawashima; Jiro Utsunomiya; Kiyoshi Kurosawa; Iida Saburo, all of Tokyo; Ryo Nagase; Akira Himeno, both of Mito; Ken-ichi Yukimatsu, Sayama; Masayuki Okyno, Mito; Kuniharu Kato, Naka; Masao Kawachi, Mito, all of Japan

[73] Assignees: Oki Electric Industry Co.Ltd.; Nippon Telegraph and Telephone Corporation, both of Tokyo, Japan

[21] Appl. No.: 216,040

[22] Filed: Jun. 14, 1994

[30] Foreign Application Priority Data

Jun. 17, 1993 [JP] Japan .................................. 5-145855
Jun. 17, 1993 [JP] Japan .................................. 5-146490
Jun. 17, 1993 [JP] Japan .................................. 5-146492

[51] Int. Cl.$^6$ .................................................. G02B 6/26
[52] U.S. Cl. .................. 385/16; 385/14; 385/17; 385/24; 385/40
[58] Field of Search .......................... 385/16, 1, 2, 8, 385/9, 24, 41, 47, 14, 39, 40, 43

[56] References Cited

U.S. PATENT DOCUMENTS 4,648,686  3/1987  Segawa ........................................ 385/17
5,123,065  6/1992  Enochs ......................................... 385/9
5,295,011  3/1994  Heise ........................................... 385/24

FOREIGN PATENT DOCUMENTS

0445763A2  9/1191  European Pat. Off. .
2167575    5/1986  United Kingdom .

OTHER PUBLICATIONS

Ito et al., "Photonic Inter–Module Connector Using Silica–Based Optical Switches", Globecom 92, Orlando, Florida, 1992, pp. 187–191.

*Primary Examiner*—Rodney E. Bovernick
*Assistant Examiner*—Hemang Sanghavi
*Attorney, Agent, or Firm*—Wenderoth, Lind & Ponack

[57] ABSTRACT

An optical switching module has an optical waveguide substrate mounted on an electronic circuit substrate. According to a first aspect of the invention, the optical waveguide substrate has thin-film heaters, and the electronic circuit substrate has trimmable thick-film resistors for adjusting current fed to the thin-film heaters. According to a second aspect of the invention, the optical switching module also has a pair of fiber pigtails butt-coupled to the optical waveguide substrate. The fiber pigtails are secured to the ends of a supporter, which is attached to a heat sink fastened below the electronic circuit substrate. According to a third aspect of the invention, the optical waveguide substrate is mounted in a depression in the electronic circuit substrate. The invention reduces the size of the optical switching module.

7 Claims, 7 Drawing Sheets

COMPACT OPTICAL SWITCHING MODULE INCLUDING THIN-FILM HEATERS AND TRIMMED THICK-FILM FIXED RESISTORS

BACKGROUND OF THE INVENTION

This invention relates to an optical switching module for switching lightwave signals in a telephone switching system or the like, more particularly to an optical switching module configured for reduced size.

Increased use of fiber-optic communications has given rise to the need to switch lightwave signals without opto-electric and electro-optic conversion. For example, in a switching system comprising a plurality of subscriber line concentrator modules which exchange lightwave signals with a plurality of circuit switching modules via an inter-module connector, the connector needs to be able to switch the connections among modules so that a faulty circuit-switching module can be replaced by a standby module. The inter-module connector, accordingly, preferably includes one or more optical switching modules.

One type of optical switching module comprises a matrix of thermo-optic switching elements interconnected by waveguides formed on a silica substrate. Switching is accomplished by the use of thin-film heaters to vary the temperature of the switching elements. The module also includes electronic circuits for feeding switching current to the heaters, and a heat sink to dissipate heat caused by the switching operations.

Adjustment of the switching current is conventionally carried out manually, by mechanically adjusting variable resistors such as trimmer potentiometers provided in the electronic circuits. A disadvantage of this arrangement is that it consumes both space and time. Mechanically adjustable variable resistors are comparatively large devices that take up space in the switching module, and adjusting them manually is a slow, inefficient process.

Attachment of optical fibers causes a further problem. Conventionally, fiber pigtails are butt-coupled to waveguides in the switch matrix by an adhesive, then secured to the heat sink at a certain distance from the butt joints to protect the butt joints from mechanical stress. A disadvantage of this arrangement is that to provide a platform for securing the fiber pigtails, the heat sink must be physically larger than the switch matrix; that is, it must be larger than necessary simply to dissipate the heat produced by switching.

The heat sink comprises fins projecting from a flat base. The height of the fins is proportional to the overall size of the heat sink, so increasing the length of the heat sink to provide supports for the fiber pigtails has the further disadvantage of increasing the height of the module assembly.

SUMMARY OF THE INVENTION

It is accordingly an object of the present invention to reduce the size of an optical switching module.

Another object of the invention is to simplify the manufacture of an optical switching module, particularly in regard to wire bonding and resistance adjustment.

The invented optical switching module comprises an optical waveguide substrate with a plurality of waveguides configured to form switches. The optical waveguide substrate is mounted on the upper surface of an electronic circuit substrate having electronic circuits for controlling the switches.

According to a first aspect of the invention, the switches have thin-film heaters which selectively heat the waveguides in the optical waveguide substrate, and the electronic circuit substrate has trimmable thick-film resistors for adjusting the currents fed to the thin-film heaters. The adjustment is performed, preferably by laser trimming, when the optical switching module is manufactured.

According to a second aspect of the invention, the optical switching module also has a pair of fiber pigtails butt-coupled to the optical waveguide substrate for input and output of lightwave signals, a heat sink mounted below the electronic circuit substrate, and a supporter attached to the heat sink. The fiber pigtails are secured to holders on the two ends of the supporter, which extend beyond the edges of the electronic circuit substrate. The heat sink is substantially equal in length and width to the optical waveguide substrate.

According to a third aspect of the invention, the optical waveguide substrate is mounted in a depression in the electronic circuit substrate, to reduce the height of the assembly and facilitate wire bonding between the two substrates.

DETAILED DESCRIPTION OF THE INVENTION

Figure 1:
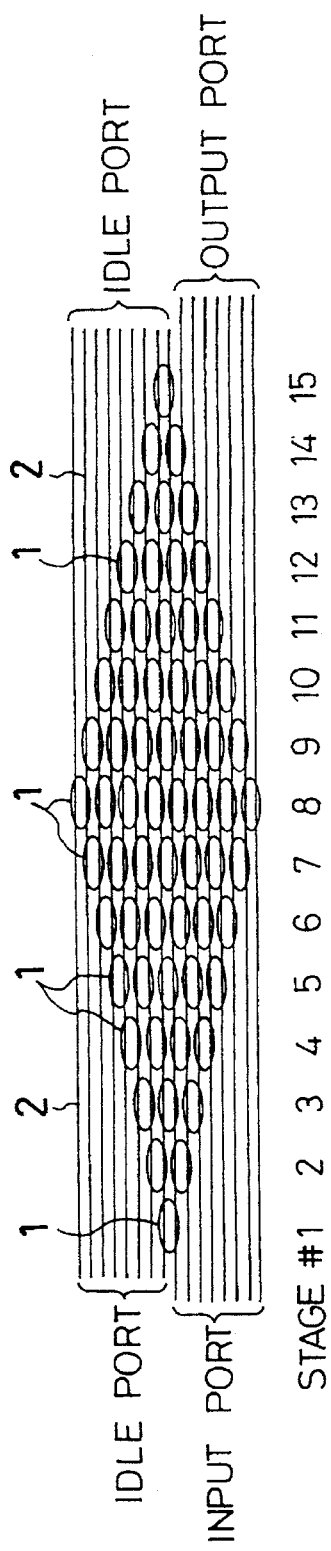
FIG. 1 is a schematic drawing of an 8×8 optical switch matrix.

An 8×8 optical switching module embodying the present invention will be described with reference to the attached drawings. The invention is not restricted to the configurations and dimensions shown in the drawings; the scope of the invention should be determined from the appended claims.

FIG. 1 schematically shows an 8×8 optical switch matrix. The matrix comprises sixty-four 2×2 crossbar switches 1 coupled by waveguides 2 into a matrix having an input port and an output port. Each port accommodates eight optical fibers. There are actually sixteen waveguides on both the input and output sides, but eight waveguides on each side terminate in an unused idle port. The 2×2 crossbar switches are grouped into fifteen stages, as indicated by numbers at the bottom of FIG. 1.

Figure 2:
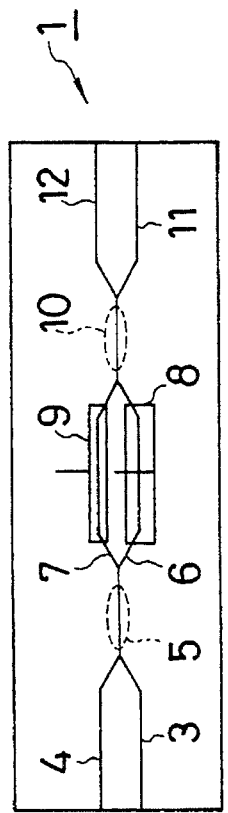
FIG. 2 is a plan view of a 2×2 crossbar switch.

Referring to FIG. 2, each 2×2 crossbar switch is a symmetrical Mach-Zehnder interferometer. The two input waveguides 3 and 4 (two of the waveguides 2 in FIG. 1) are coupled through a first 3-dB coupler 5 to two arm waveguides 6 and 7. The arm waveguides 6 and 7 pass under thin-film heaters 8 and 9, then rejoin and are coupled through a second 3-dB coupler 10 to two output waveguides 11 and 12.

When the 2×2 crossbar switch is in the cross state, light entering from waveguide 3 exits at waveguide 12, and light entering from waveguide 4 exits at waveguide 11. When the 2×2 crossbar switch is in the bar state, light entering from waveguide 3 exits at waveguide 11, and light entering from waveguide 4 exits at waveguide 12. Switching between these states is effected by controlling the temperatures of the arm waveguides 6 and 7 by means of the thin-film heaters 8 and 9, taking advantage of a well-known thermo-optic effect that causes index of refraction to vary according to temperature.

Figure 3:
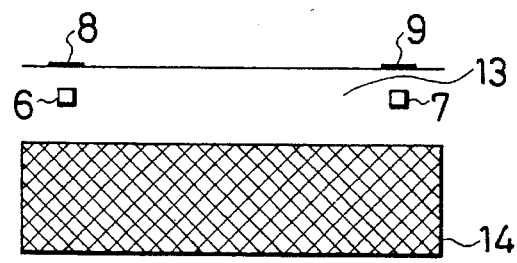
FIG. 3 is a sectional view of a 2×2 crossbar switch.

FIG. 3 is a sectional view of a 2×2 crossbar switch 1, indicating the relative positions of the arm waveguides 6 and 7 and thin-film heaters 8 and 9. The arm waveguides 6 and 7 are waveguide cores embedded in a cladding 13 on an optical waveguide substrate 14. The thin-film heaters 8 and 9 are formed on the cladding 13 over the arm waveguides 6 and 7.

The thin-film heaters 8 and 9 are redundant in that switching can be carried out using just one of them. If satisfactory operation is obtained with only one heater 8, the other heater 9 can be omitted.

Figure 4:
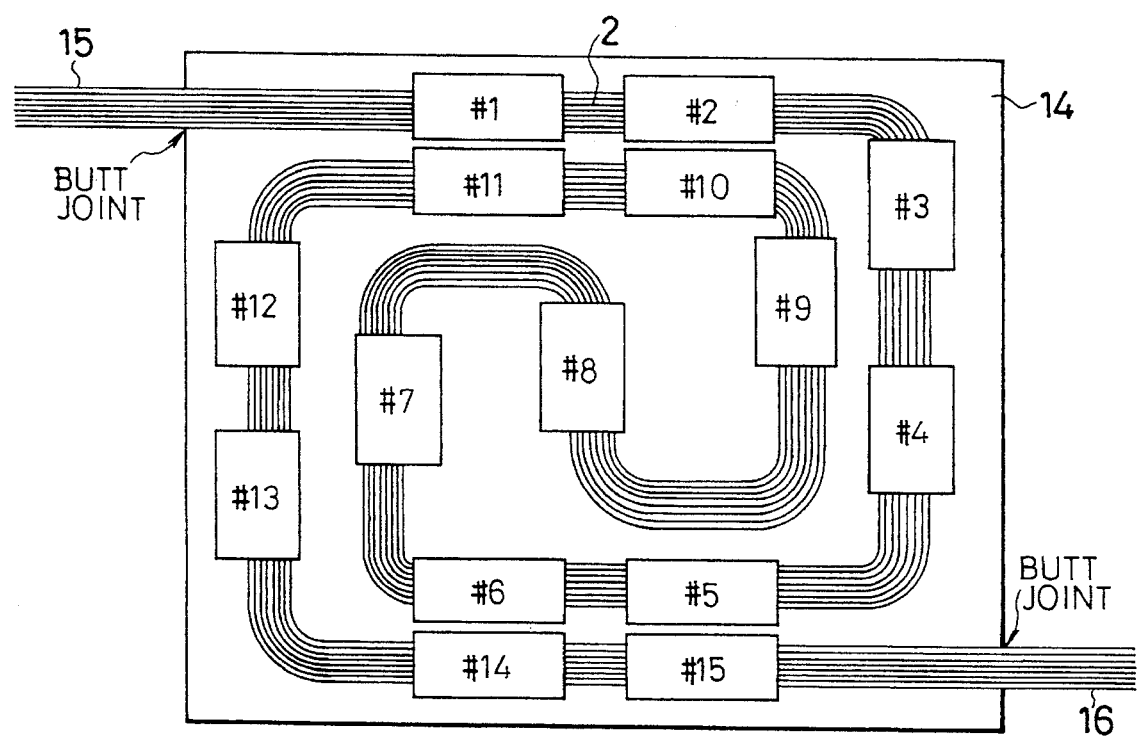
FIG. 4 is a plan view showing the layout of an 8×8 optical switch.

FIG. 4 shows the layout of the 8×8 optical switch matrix in plan view. To save space, the waveguides 2 follow a serpentine path, along which are disposed the fifteen stages indicated in FIG. 1. (Only eight of the sixteen parallel waveguides 2 are indicated in FIG. 4.) An input fiber pigtail 15 comprising an optical ribbon cable with eight fiber cores is butt-coupled to the input port of the matrix. A similar output fiber pigtail 16 is butt-coupled to the output port. If necessary, the output fiber pigtail 16 may have an additional eight fibers coupled to the idle port on the output side, for use in adjustments during the manufacturing process, for example.

Figure 5:
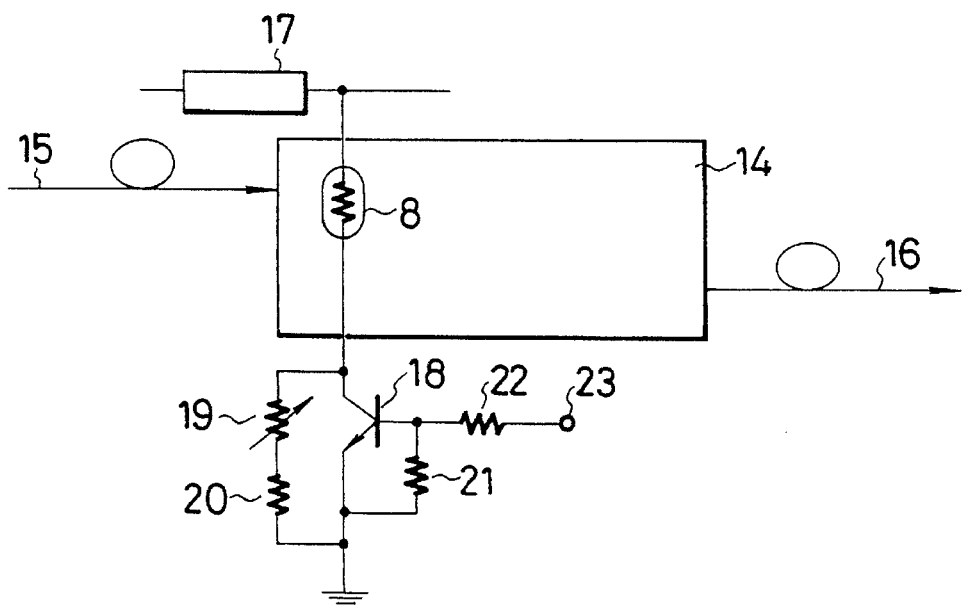
FIG. 5 is a schematic diagram of a circuit for controlling a 2×2 crossbar switch.

FIG. 5 is a schematic diagram of a circuit for controlling a thin-film heater, such as the thin-film heater 8 shown in FIGS. 2 and 3. The optical waveguide substrate 14 and fiber pigtails 15 and 16 are as in FIG. 4. Electrical power is supplied to the thin-film heater 8 from a constant-voltage power source 17. Current flows through the thin-film heater 8 to ground, the flow being controlled by a circuit comprising a transistor 18, trimmable resistor 19, and fixed resistors 20, 21, and 22, which are interconnected as shown. The trimmable resistor 19 and fixed resistor 20 regulate current flow through the thin-film heater 8. Fixed resistors 21 and 22 regulate the base-emitter voltage of the transistor 18 in the on-state. These resistors 21 and 22 are preferably integrated with the transistor 18 into a single unit.

The transistor 18 is turned on or off by a signal from an external device (not shown), which is received at an input terminal 23 such as a connector pin. When switched on, transistor 18 allows substantial electrical current to flow through the thin-film heater 8. Corresponding heat is generated, placing the associated 2×2 crossbar switch in, for example, the bar state. When transistor 18 is switched off, current flow through the thin-film heater 8 is limited by resistors 19 and 20, less heat is generated, and the crossbar switch switches to the other state, e.g. the cross state.

The amount of current fed through the thin-film heater 8 in the cross state is adjusted by the trimmable resistor 19. The adjustment is performed when the optical switching module is manufactured.

The preceding drawings have illustrated the general configuration of an optical switching module and indicated how switching is accomplished. A more thorough explanation of the switching operations will be omitted, as the details will be familiar to those skilled in the art. The following drawings will instead illustrate novel features of the present invention.

Figure 6:
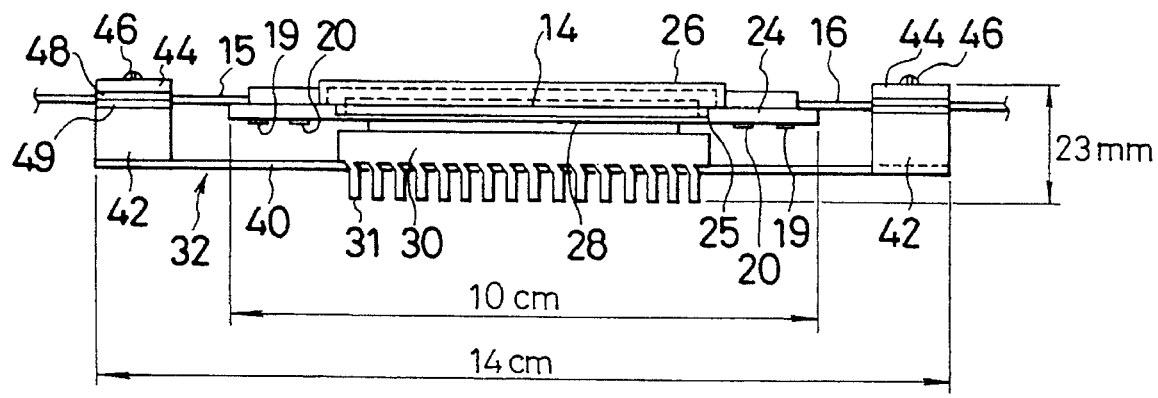
FIG. 6 is a sectional view of a novel optical switching module.

FIG. 6 is a side view of the invented optical switching module. The optical waveguide substrate 14 with its waveguides and thin-film heaters (not explicitly shown) is mounted on an electronic circuit substrate 24 such as a multilayer ceramic substrate that also carries the resistors and other electronic components indicated in FIG. 5. More specifically, the optical waveguide substrate 14 is mounted in a depression 25 in the upper side of the electronic circuit substrate 24. The optical waveguide substrate 14 is attached to the electronic circuit substrate 24 by a silicon-based adhesive.

The trimmable resistors 19 and fixed resistors 20 are disposed on the lower side of the electronic circuit substrate 24 in the positions shown, near two opposite edges of the substrate 24. The transistors 18 and resistors 21 and 22 of FIG. 5 are mounted in other appropriate locations (not indicated) on the electronic circuit substrate 24. The optical waveguide substrate 14 is covered by a protective cap 26.

A spacer 28 is attached by an adhesive to the lower surface of the electronic circuit substrate 24, inward of the fixed resistors 20. A finned heat sink 30 and supporter 32 are attached to the spacer 28. The fiber pigtails 15 and 16 are supported by the supporter 32, so the heat sink 30 need not be large; it should have substantially the same length and width as the optical waveguide substrate 14.

If the electronic circuit substrate 24 has the form of a square measuring ten centimeters on a side, for example, then the height of the entire optical switching module, including the fins 31 of the heat sink 30, need not exceed three centimeters. A height of twenty-three millimeters has proven feasible, as indicated in the drawing.

The detailed structure of the supporter 32 will be described later, after a description of the structure, disposition, and adjustment of the resistors 19 and 20.

Figure 7:
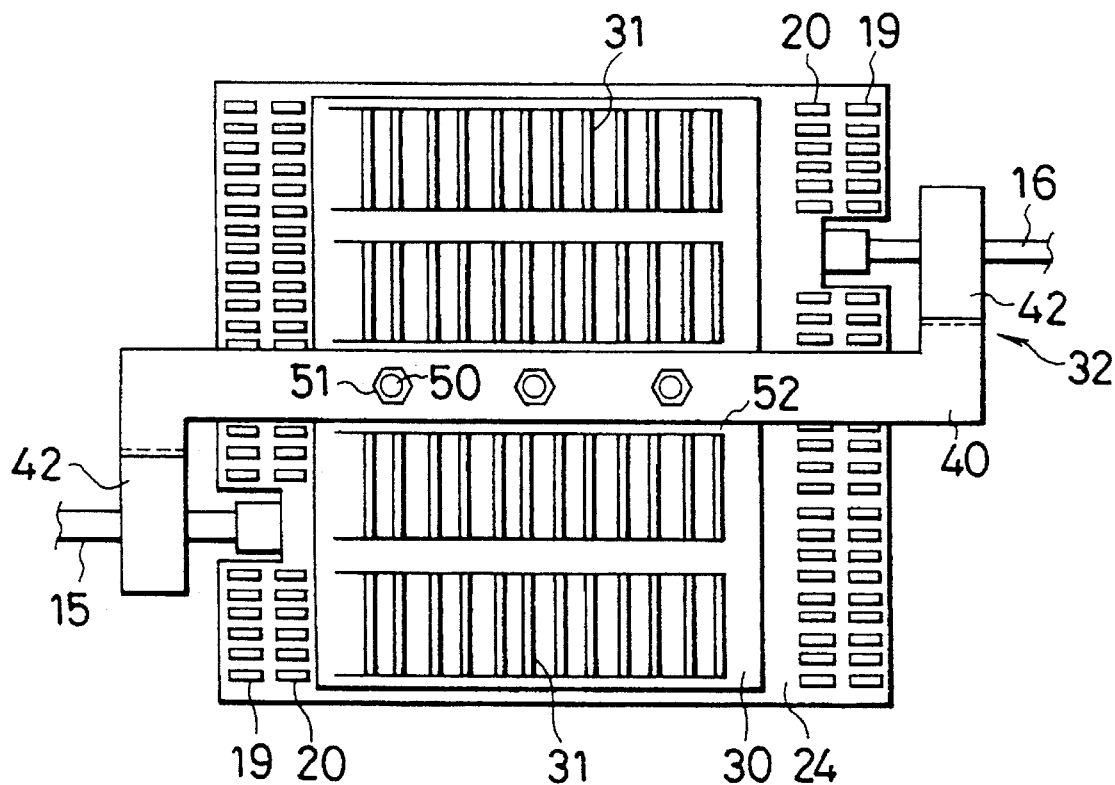
FIG. 7 is a bottom view of the novel optical switching module.

Referring to FIG. 7, the trimmable resistors 19 are disposed along the above-mentioned edges of the electronic circuit substrate 24. The fixed resistors 20 are disposed in two rows parallel to these rows, between the trimmable resistors 19 and heat sink 30. These resistors 19 and 20 are thick-film resistors which can be printed, pair by pair, directly on the electronic circuit substrate 24.

Alternatively, thick-film chip transistors can be used instead of printed transistors, the chips being mounted on the electronic circuit substrate 24. In either case, thick-film resistors take up much less space than conventional potentiometer-type variable resistors, so considerable space is saved.

The invention is not restricted to mounting of the thick-film resistors 19 and 20 on the lower surface of the electronic circuit substrate 24. Space is also saved if some or all of these thick-film resistors are mounted on the tipper surface of the electronic circuit substrate 24, beside the optical waveguide substrate 14.

The resistance values of the trimmable resistors 19 are adjusted by laser trimming. The adjustment can be conveniently performed after the optical waveguide substrate 14 has been mounted on the electronic circuit substrate 24 and the electronic components shown in FIG. 5 have been printed or mounted, but before the heat sink 30 and supporter 32 are attached. The adjustment is carried out by propagating light through each 2×2 crossbar switch 1 in the cross state and adjusting its trimmable resistor 19 so as to minimize crosstalk between the switched pair of lightwave signals. No adjustment is made in the bar state, because crosstalk in the bar state appears at the idle output port and does not affect normal operation of the optical switching module.

Even more conveniently, the optical waveguide substrate 14 can be tested as an independent unit, and the resistors 19 can be trimmed according to the the results before the optical waveguide substrate 14 is mounted in the electronic circuit substrate 24.

Laser trimming is a process well suited to automation, so the entire test and adjustment process can be carried out automatically. Manual adjustment is not required.

The invention is not restricted to adjustment of just one trimmable resistor per crossbar switch. If necessary, the circuit in FIG. 5 can be modified so that current flow is adjusted by two trimmable thick-film resistors. The second trimmable resistor is inserted in series between the transistor 18 and thin-film heater 8 in FIG. 5.

Figure 8:
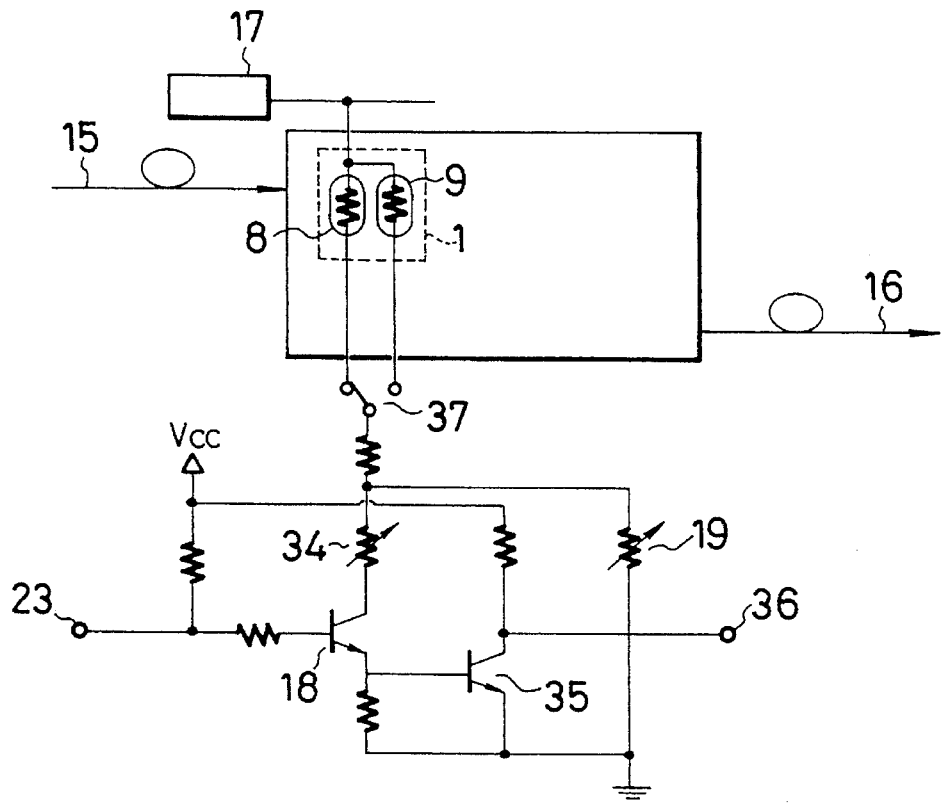
FIG. 8 is a schematic diagram of another circuit for controlling a 2×2 crossbar switch.

FIG. 8 shows a circuit in which this modification and further modifications have been made. Elements identical to elements in FIG. 7 have the same reference numerals. The circuit comprises a second trimmable resistor 34 as described above, a second transistor 35 for monitoring the state off the first transistor 18 at an output terminal 36, and a switch 37 permitting current to be directed through either of two thin-film heaters 8 and 9 in a 2×2 crossbar switch 1. Both trimmable resistors 19 and 34 are thick-film resistors, and both are trimmed by laser trimming as described above. One of the two transistors 19 and 34 is trimmed so as to minimize crosstalk in the cross state; the other is trimmed so as to minimize crosstalk in the bar state.

The resistors shown without reference numerals in FIG. 8 perform functions similar to resistors 20, 21, and 22 in FIG. 7. Descriptions will be omitted to avoid obscuring the invention with irrelevant detail.

Next the structure of the supporter 32, which is another novel feature of the present invention, will be described.

Referring again to FIG. 6, the supporter 32 comprises an arm member 40 attached to the underside of the heat sink 30, and a pair of holders 42 joined to either end of the arm member 40. The arm member 40 and the holders 42 are formed integrally with each other. The arm member 40 is mounted parallel to the fiber pigtails 15 and 16, and has sufficient length to project beyond both edges of the electronic circuit substrate 24. For example, if the electronic circuit substrate 24 measures ten centimeters on a side, the length of the arm member 40 may be about fourteen centimeters, as indicated in the drawing.

The fiber pigtails 15 and 16 are secured to respective holders 42 by clamp plates 44, which are fastened by screws 46 to the holders 42. The fiber pigtails 15 and 16 are protected by silicon rubber cushions 48 and 49 disposed on the lower sides of the clamp plates 44 and upper sides of the holders 42. Secured in this fashion, the fiber pigtails 15 and 16 are held firmly enough that no stress will act on the butt joints between the fiber pigtails and optical waveguide substrate 14. The holding force should be less, however, than the adhesive force at the butt joints.

Referring again to FIG. 7, the arm member 40 of the supporter 32 is secured by screws 50 and nuts 51 in a groove 52 with no fins 31, the groove 52 running lengthwise through the central part of the heat sink 30. The holders 42 extend at right angles from the ends of the arm member 40. The overall shape of the supporter 32 is adapted to provide support near the sites at which the fiber pigtails 15 and 16 are coupled to the optical waveguide substrate 14, and may be modified to accommodate the locations of these sites.

Figure 9:
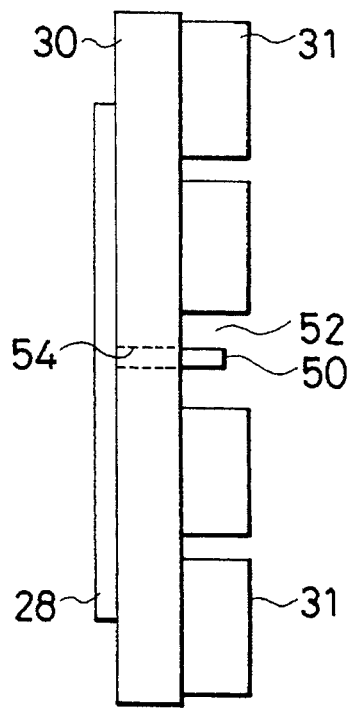
FIG. 9 is an end view of the heat sink and spacer of the novel optical switching module.

FIG. 9 is a sectional view of the spacer 28 and heat sink 30 as seen from the right or left end in FIGS. 6 and 7. The screws 50 for mounting the supporter 32 are attached to the spacer 28 and extend through holes 54 in the heat sink 30. The holes 54 are disposed in the central groove 52 between the fins 31.

When the module is assembled, first silicon grease is applied to the surface of the heat sink 30 (the upper surface in FIGS. 6 and 7, the left surface in FIG. 9). Next the heat sink 30 is placed on the spacer 28, the screws 50 extending through the holes 54. Then the supporter 32 is placed in the central groove 52 of the heat sink 30, screws 50 also extending through holes in the arm member 40. Finally, the nuts 51 are screwed down on the screws 50, securing both the supporter 32 and the heat sink 30. The supporter 32 and heat sink 30 do not have to be secured separately.

Figure 10:
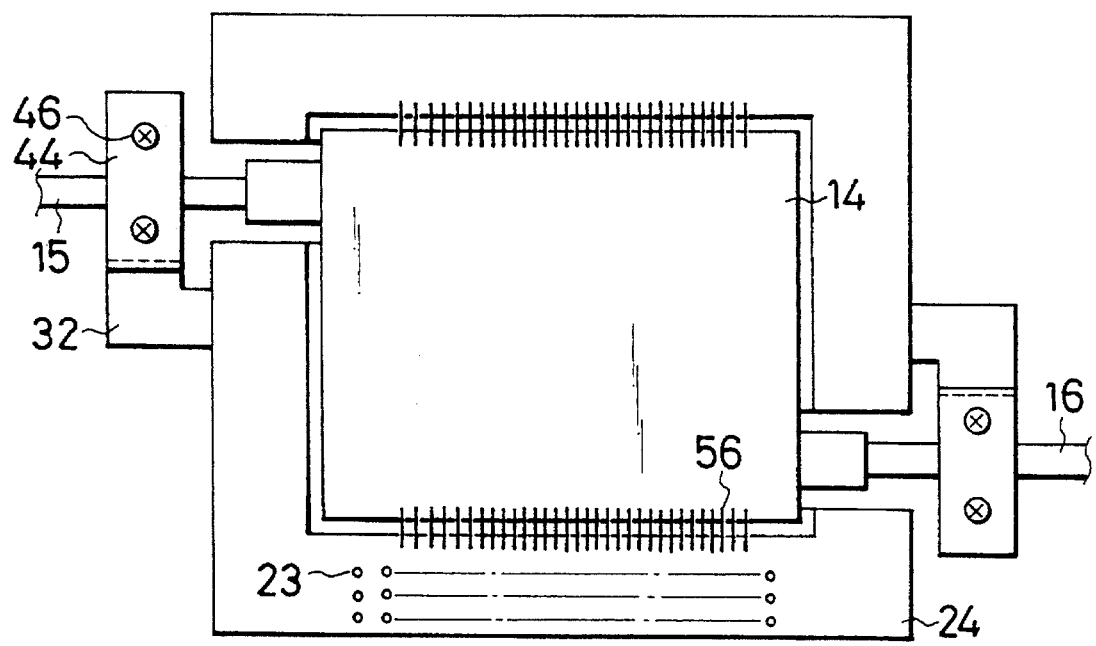
FIG. 10 is a top view of the novel optical switching module.

FIG. 10 is a top view of the optical switching module with the protective cap 26 removed so that the optical waveguide substrate 14 can be seen. As shown, the clamp plates 44 are secured to the supporter 32 by two screws 46 apiece. FIG. 10 also shows the input terminals 23 that appeared in FIG. 5. These input terminals 23 are connector pins that can be plugged into a connector for electrical connection of the circuits on the electronic circuit substrate 24 to external equipment. The circuits on the electronic circuit substrate 24 are coupled to the thin-film heaters on the optical waveguide substrate 14 by means of connecting wires 56.

Figure 11:
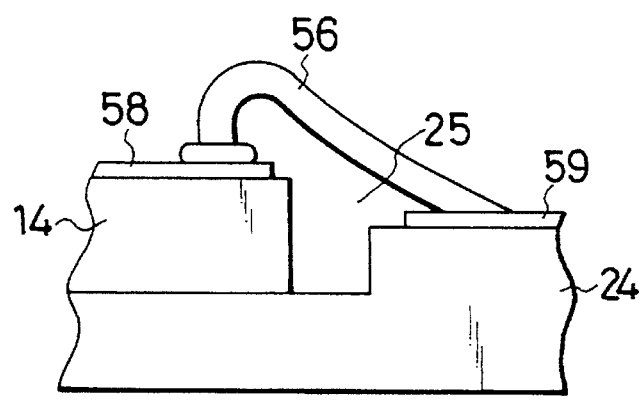
FIG. 11 is an enlarged view of a wire-bonded interconnection.

FIG. 11 shows an enlarged view of one of these connecting wires 56. The connecting wire 56 is bonded to respective bonding pads 58 and 59 on the optical waveguide substrate 14 and electronic circuit substrate 24. As mentioned earlier, the optical waveguide substrate 14 is mounted in a depression 25 in the upper surface of the electronic circuit substrate 24. This depression 25, which is another novel feature of the invention, reduces the height offset between the bonding pads 58 and 59, thereby facilitating the wire-bonding process and reducing the occurrence of wire-bonding problems such as wire breakage. A further advantage of the depression 25 is that it reduces the overall height of the optical switching module.

In the drawing, the depth of the depression 25 is substantially half the thickness of the optical waveguide substrate 14, e.g. if the optical waveguide substrate 14 is one millimeter thick, the depression 25 is half a millimeter deep. If the thickness of the electronic circuit substrate 24 permits, however, a deeper depression may be provided, to further reduce the height offset between the bonding pads 58 and 59. Ideally, the depth off the depression 25 is equal to the thickness of the optical waveguide substrate 14, so that there is no height offset.

Figure 12:
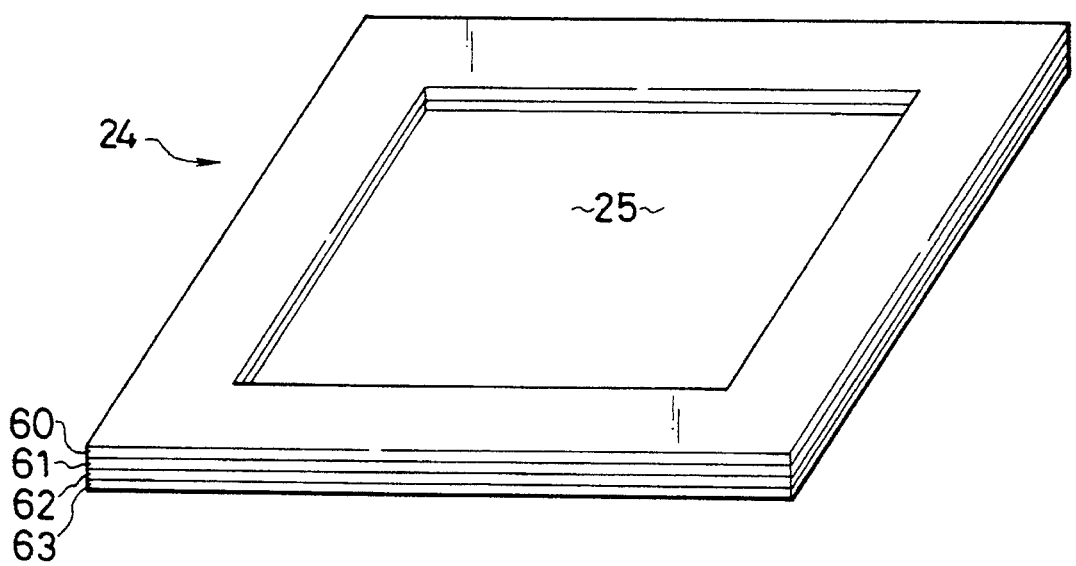
FIG. 12 is an oblique view of a multilayer electronic circuit substrate with a central depression.

Referring to FIG. 12, if the electronic circuit substrate 24 is a multilayer ceramic substrate, the depression 25 can be formed easily by use of one or more layers with an annular shape as the upper substrate layer or layers. For example, the electronic circuit substrate 24 may comprise four substrate layers 60, 61, 62, and 63, the upper two substrate layers 60 and 61 having an annular shape. The absent central portions of these upper substrate layers 60 and 61 become the depression 25.

The invented optical switching module has the following advantages. Its size is reduced by mounting the optical waveguide substrate 14 in a depression 25 on the electronic circuit substrate 24; by using a supporter 32 to support the Fiber pigtails 15 and 16, so that a relatively small heat sink 30 can be employed; and by using trimmable thick-film resisters 19 instead of mechanically adjustable variable resisters. Adjustment off the resistance values of these resisters can be automated by laser trimming. Assembly of the module is simplified in that the heat sink 30 and the supporter 32 are secured by the same screws 50. Wire bonding is facilitated by the reduced height offset between the two substrates 14 and 24.

The invention is not restricted to an 8×8 optical switch matrix. It can obviously be practiced with other matrix configurations.

Those skilled in the art will recognize that further modifications can be made without departing from the scope of the invention as claimed below.

What is claimed is:

1. An optical switching module, comprising:

an optical waveguide substrate having a plurality of waveguides configured to form switches for switching lightwave signals;

a plurality of thin-film heaters formed on said optical waveguide substrate, for controlling said switches by selectively heating the waveguides therein;

an electronic circuit substrate for supporting said optical waveguide substrate and having circuits for feeding current to said thin-film heaters;

a plurality of thick-film fixed resistors disposed on said electronic circuit substrate through which the current fed to said thin-film heaters is selectively made to flow by said circuits, said thick-film fixed resistors being previously trimmed to set an amount of the current fed to said thin-film heaters;

a spacer attached to one surface of said electronic circuit substrate; and a heat sink attached of said spacer.

2. The module of claim 1 wherein said thick-film fixed resistors have been laser trimmed.

3. The module of claim 1, wherein said optical waveguide substrate is mounted on one side of said electronic circuit substrate, and said thick-film fixed resistors and said spacer are mounted on another side of said electronic circuit substrate.

4. The module of claim 1, wherein said thick-film fixed resistors are printed on said electronic circuit substrate.

5. A method of manufacturing an optical switching module for switching lightwave signals in an optical waveguide substrate, comprising the steps of:

fabricating waveguides in said optical waveguide substrate;

fabricating thin-film heaters on said optical waveguide substrate to switch said lightwave signals by selectively heating said waveguides;

mounting said optical waveguide substrate on an electronic circuit substrate having circuits for feeding current to said thin-film heaters and having thick-film fixed resistors through which said current is selectively made to flow by said circuits;

mounting a spacer on said electronic circuit substrate;

mounting a heat sink on said spacer; and trimming said thick-film fixed resistors to minimize crosstalk among said lightwave signals.

6. The method of claim 5, wherein the step of trimming said thick-film fixed resistors is carried out by laser trimming.

7. The method of claim 6, wherein the step of trimming said thick-film fixed resistors is automated.

* * * * *

UNITED STATES PATENT AND TRADEMARK OFFICE
CERTIFICATE OF CORRECTION

PATENT NO. : 5,513,285
DATED : April 30, 1996
INVENTOR(S) : Toshiyuki KAWASHIMA et al.

It is certified that error appears in the above-indentified patent and that said Letters Patent is hereby corrected as shown below:

On the cover page, item [75] *Inventors,* lines 2 and 3: change "Iida Saburo" to --Saburo Iida--.

On the cover page, item [75] *Inventors,* line 6: change "Okyno" to --Okuno--.

On the cover page, item [21] *Appl. No.,* change "216,040" to 261,040.

Column 8, line 3, change "of" to --to--.

Signed and Sealed this

Eighteenth Day of February, 1997

Attest:

BRUCE LEHMAN

*Attesting Officer*     *Commissioner of Patents and Trademarks*